United States Patent Office 3,426,852
Patented Feb. 11, 1969

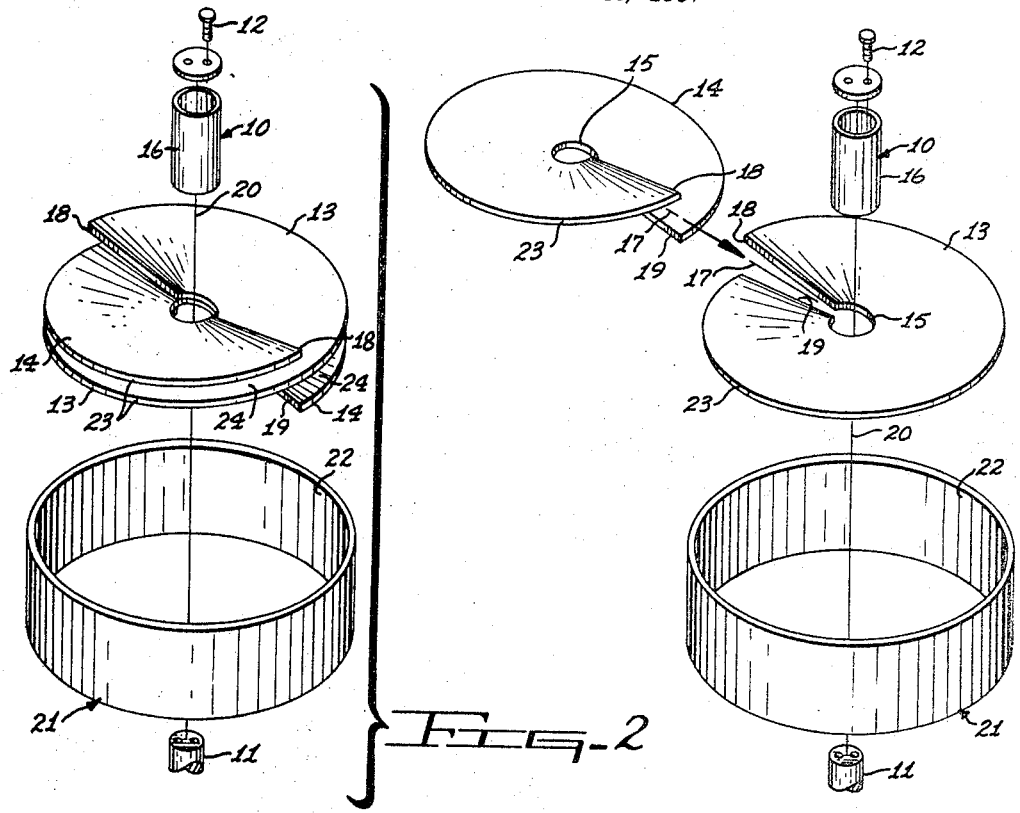

3,426,852
PROPELLER STRUCTURE
Lewis R. Kinsey, 108 S. 25th St., Phoenix, Ariz. 85034
Filed Mar. 13, 1967, Ser. No. 622,602
U.S. Cl. 170—156
Int. Cl. F04d 29/32; B64c 11/00
1 Claim

ABSTRACT OF THE DISCLOSURE

A propeller structure particularly adapted for use as a lift fan in vertical take-off and landing aircraft and helicopter types of aircraft that is completely enclosed on all sides and all air going in at the top stays inside the propeller periphery in which the propeller structure having a large area of lifting surface formed by a specially constructed overlapping helical blade surfaces.

Background of the invention (1) The field of this invention lies in propeller structures for engaging a fluid medium, particularly air as in aircraft and is especially adapted to vertical sustaining propeller mechanisms for such aircraft.

(2) Heretofore it has been found that the design of propellers and particularly lift fans for vertical take-off and landing aircraft have lacked the necessary number of square feet of lifting surface per lift fan for the lift and control required in such aircraft. Normally, the ordinary type of propeller when turned vertical for lifting purposes has been highly inefficient because it has too small a surface area engaging the air and thereby has provided little holding ability much less lifting ability. An ordinary propeller as used in the past for lifting purposes is designed for the top of the scale and to move through the air at rapid speed whereas the propeller structure of this application is designed for very slow speed operation with high lifting power and efficiency.

Summary of the invention

It is the object of the instant invention to provide a propeller structure, particularly adapted to aircraft of the vertical lift type in which there is a very high surface area in contact with the air and relatively slow speeds of rotation are required.

Still another object of this invention is to provide a propeller apparatus which is constructed to contact a large amount of air at the same time so as to provide the greater number of square feet of lifting surface for the size of the propeller structure being used.

Still another object is to provide such a propeller structure which will give the maximum lift with a minimum of power requirement.

It is also another object of this invention to construct a lift fan or propeller apparatus in the nature of a corkscrew having several rounds of continuous unbroken fan blade from the top to the bottom axially of the propeller structure and in which all of the air circulated through the blades is completely enclosed on the sides from the top to the bottom of the propeller so that the air will not spill out peripherally or along the hub or sides until it has been fully energized and utilized by the propeller.

Brief description of the drawings

FIG. 1 is an exploded view of the propeller structure incorporating the features of this invention.

FIG. 2 is an exploded view but showing the propeller blade portions interfitted for final assembly.

FIG. 3 is a perspective view showing the assembled propeller structure.

FIG. 4 is an enlarged sectional view of the line 4—4 of FIG. 3.

FIG. 5 is an enlarged sectional view of the line 5—5 of FIG. 3.

Description of the preferred embodiment

As an example of a preferred embodiment of the invention, there is shown a propeller structure comprising a hub 10 which is arranged to be suitably attached to a propeller shaft 11 of a suitable prime mover of an aircraft by bolts 12 or other fastening means. The fan portions of the propeller are formed from a plurality of disc members 13 and 14 each having a centrally positioned bore 15 which fits and is rigidly secured to the outside diameter 16 of the hub 10. Each disc has a single radially extending parting line 17 formed by radially outwardly diverging facing edge surfaces 18 and 19, the surfaces 18 sloping upwardly and outwardly, and the surfaces 19 sloping outwardly and downwardly, as shown in FIG. 1.

The fan discs are interfitted as shown in FIG. 2 so that the facing edges 18 and 19 lie in a common diametrically disposed plane defined by the axis 20 of rotation of the propeller structure, with the surfaces 18–19 of each disc 13 and 14 on diametrically opposite sides of the axis 20. Around this fan disc assembly is provided an annular air control ring 21, FIG. 3, having a bore 22 rigidly fixed to the periphery 23 of the fan discs 13 and 14. In this manner a plurality of continuous closed multi-lead helical air passageways 24 are provided between the outer diameter 16 of the hub 10 and the bore 22 of the air control ring 21 so that the fan discs 13 and 14 are completely enclosed on all sides and all air going in axially at one end of the propeller must stay inside where it can be fully used before it is exhausted out at the other end. This enclosure not only eliminates the loss of air through spillover but also permits a greater quantity of air to be retained inside under the lifting surface so that this combination will give the greatest amount of lift per rotor diameter per horsepower applied to the drive shaft 11.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendant claims are intended to be included herein.

I claim:
1. A propeller structure comprising in combination:
(A) a rotatable propeller shaft,
(B) a hub fixed to the propeller shaft,
(C) fan portions of the propeller structure characterized by,
(D) a pair of fan disc members each having a centrally positioned bore fitting and rigidly secured to the outside diameter of the hub,
(E) each fan disc having a single radially extending parting line formed by radially outwardly diverging facing edge surfaces,
(F) the surfaces sloping outwardly and downwardly,
(G) the fan discs being moved radially of each other to a coaxial interfitted position so that the facing edge surfaces lie in a common diametrically disposed plane defined by the axis of rotation of the propeller shaft and hub,
(H) with the facing edge surfaces of each disc on diametrically opposite sides of the axis of rotation,
(I) and with the portion of each fan disc 180° removed from its facing edges is located between and axially spaced from the facing edges of the other fan disc, and an annular air control ring having a bore fixed to the periphery of said fan discs so as to form a helical air passageway between said hub and said annular air control ring.

References Cited

UNITED STATES PATENTS

| | | | |
|---|---|---|---|
| 352,394 | 11/1886 | Campbell | 103—91 |
| 897,738 | 9/1908 | Gordon | 170—157 |
| 573,963 | 12/1896 | Corn | 103—89 |
| 1,058,790 | 4/1913 | Pierce | 103—89 |
| 1,738,994 | 12/1929 | Gredell | 29—156.8 |
| 2,980,667 | 4/1961 | Coombs | 103—91 |

FOREIGN PATENTS

| | | |
|---|---|---|
| 924,207 | 3/1947 | France. |
| 45,684 | 9/1919 | Sweden. |

HENRY F. RADUAZO, *Primary Examiner.*

U.S. Cl. X.R.

230—134